United States Patent [19]

Rogers et al.

[11] 3,901,716
[45] Aug. 26, 1975

[54] MICRO-CRYSTALLINE MATERIAL AND METHOD OF PREPARATION

[75] Inventors: Philip Sydney Rogers; James Williamson, both of London; Peter Edwin Johnson, East Barnet, all of England

[73] Assignee: National Research Development Corporation, London, England

[22] Filed: Jan. 22, 1974

[21] Appl. No.: 435,508

[30] Foreign Application Priority Data
Feb. 2, 1973    United Kingdom................. 5408/73

[52] U.S. Cl.................................... 106/39.6; 65/33
[51] Int. Cl............................................ C03b 29/00
[58] Field of Search........................ 65/33; 106/39.6

[56] References Cited
UNITED STATES PATENTS

| | | | |
|---|---|---|---|
| 1,143,885 | 6/1915 | Brookfield | 65/33 |
| 1,893,382 | 11/1933 | Watson | 65/33 |
| 3,205,079 | 9/1965 | Stookey | 65/33 X |
| 3,268,315 | 8/1966 | Stookey | 65/33 |
| 3,557,575 | 1/1971 | Beal | 65/33 |
| 3,677,728 | 7/1972 | Kitaigorodsky et al. | 65/33 |
| 3,804,608 | 4/1974 | Gaskell et al. | 65/33 |
| 3,819,387 | 6/1974 | Leger et al. | 65/33 X |

Primary Examiner—S. Leon Bashore
Assistant Examiner—Frank W. Miga
Attorney, Agent, or Firm—Watson, Cole, Grindle & Watson

[57] ABSTRACT

The invention relates to a method of making a refractory micro-crystalline material by devitrification of a melt of a base glass composition containing $Al_2O_3$, $SiO_2$ and, optionally, CaO and MgO, and as additives to the base glass composition, iron oxide and chromium oxide, wherein devitrification is carried out by cooling the melt without re-heating the melt at any stage; and to a refractory micro-crystalline material.

15 Claims, No Drawings

MICRO-CRYSTALLINE MATERIAL AND METHOD OF PREPARATION

BACKGROUND OF THE INVENTION

The micro-crystalline materials of the invention are glass ceramics having a high modulus of rupture combined with hardness, impermeability and resistance to chemical attack and abrasion. Certain of the glass forming techniques which are used in the production of glass-ceramics are rendered more favourable by adoption of a heat treatment which does not require a re-heating stage e.g. rolling, casing and pressing. Hence, products made of the glass-ceramics of the invention beneficially take advantage of the favourable physical properties of the material and the convenience of the forming and shaping techniques. Examples of the application of these materials are as follows:

a. Pipelines, nozzles, unions and valve seats, for conveying corrosive fluids and fluids carrying abrasive solid particles, e.g. drain pipes and guttering.

b. Wear resistant ducts and sheets, for chutes and paving.

c. Kerbstones and flagstones.

d. Flat (or corrugated) sheet, for certain walling cladding or tiles.

e. Prefabricated linings for tunnels.

f. Bottles and containers.

g. Low grade refractories e.g. furnace linings and supports for electrical heating elements.

h. Fan blades.

In the past, micro-crystalline glass-ceramics have been produced by cooling a melt of a glass composition which often contains a metallurgical slag, and a nucleating agent and thereafter re-heating the glass composition in order to make it crystalline. For example, United Kingdom Pat. No. 1,152,417 describes the preparation of micro-crystalline materials by devitrification of a glass made from a metallurgical slag, the material consisting of $SiO_2$, MgO, $Al_2O_3$ and $Cr_2O_3$ in the relative proportions, by weight, of 46 to 62% $SiO_2$, 21 to 34% MgO, 10 to 21% $Al_2O_3$ and 1.5 to 5% $Cr_2O_3$ and optionally containing CaO and FeO in the relative proportions, by weight, of up to 2% CaO and up to 1.5% FeO. Although it is stated in the specification that a limited range of the compositions will crystallise merely by cooling at a suitable rate, the specification does not teach which compositions fall within the limited range or the way in which the cooling is to be carried out.

It is an object of the present invention to produce a micro-crystalline material by the controlled cooling of a melt of a particular range of glass compositions without any need for re-heating.

SUMMARY OF THE INVENTION

The invention provides a method of making a micro-crystalline material comprising the steps of (1) preparing a melt of a composition comprising a base glass composition consisting of from 0 to 30 weight percent MgO, from 5 to 35 weight percent $Al_2O_3$, from 35 to 75 weight percent $SiO_2$, and from 0 to 30 weight percent CaO; from 0.5 to 3 parts by weight chromium oxide (expressed as $Cr_2O_3$) per 100 parts by weight of the base glass composition and from 0.5 to 10 parts by weight iron oxide (expressed as $Fe_2O_3$) per 100 parts by weight of the base glass composition, and (2) Cooling the melt at such a rate that initially crystals of spinel, mostly less than 1 $\mu$m in size, are formed within the melt and subsequently crystals of a silicate phase grow upon the spinel crystals to yield the micro-crystalline material.

The invention also provides a micro-crystalline material comprising from 0 to 30 weight percent MgO, from 5 to 35 weight percent $Al_2O_3$, from 35 to 75 weight percent $SiO_2$, from greater than 8.5 to less than 30 weight percent CaO, from 0.5 to 3 parts by weight chromium oxide (expressed as $Cr_2O_3$) per 100 part by weight of the combined MgO, $Al_2O_3$, $SiO_2$ and CaO, and from 0.5 to 10 parts by weight iron oxide (expressed as $Fe_2O_3$) per 100 parts by weight of the combined MgO, $Al_2O_3$, $SiO_2$ and CaO.

DESCRIPTION OF THE PREFERRED EMBODIMENTS

It may be advantageous to employ greater than 2, greater than 8.5 or in some cases greater than 12 weight percent CaO.

It may be advantageous to employ from 5 to 30 weight percent MgO.

Spinel describes members of a group of minerals having the general formula $AO.B_2O_3$ where AO represents the oxide of a divalent metal and $B_2O_3$ represents the oxide of a trivalent metal. A may, for example, be Mg or Fe. B may, for example, be Al, Cr or Fe. Extensive solid solution can occur between two or more end members of the spinel group and two or more spinel solid solutions can exist together. During the second stage of the cooling process crystals of a silicate phase grow upon the spinel crystals by a heterogeneous nucleation process. The silicate crystals so formed are usually of mineral phases belonging to the pyroxene group which describes members of a group of metasilicate minerals, particular examples being enstatite and clino-enstatite both having the composition $MgO.SiO_2$ and diopside having the composition $CaO.MgO.2SiO_2$. Extensive solid solution can take place between different members of the pyroxene group.

Once crystals of a silicate phase have begun to grow upon the spinel crystals, the remaining glass is then fully or partially divitrified. The final micro-cyrstalline material may still contain up to 20 weight percent residual glass. The proportion of residual glass can be controlled as required and for most applications a residual glass content of up to 5 weight percent is suitable.

Chromium oxide and iron oxide are added to the base glass composition to control the formation of heterogeneous nuclei i.e. spinel crystals. The chromium oxide may be added to the batch before or after melting either as an oxide of chromium, as a chromate or some other convenient compound of chromium. When ion blast-furnace slag is one of the constituents, chrome ore can conveniently be used as a source of chromium oxide and iron oxide. Similarly, the iron oxide may be added to the batch before or after melting either as an oxide of iron e.g. haematite or magnetite, a hydrated oxide of iron or some other convenient compound of iron such as a mineral containing iron oxide. The chromium and iron compounds may be added together or separately.

When iron oxide is used, the most convenient form is ferric oxide, $Fe_2O_3$, since this most readily provides the trivalent cations required for the formation of spinel.

Further, when iron oxide is used, the components of the glass composition are preferably melted together in an oxidising atmosphere e.g. air, so that most of the iron is present in the glass in the ferric state. Under these conditions, iron oxide additive need only be present in from 0.5 to 5 parts by weight per 100 parts of the base glass. If the melting furnace atmosphere is more reducing, it is thought that more iron oxide may be required from 0.5 to 10 parts by weight per 100 parts of the base glass) since a higher proportion of the iron will be in the ferrous (divalent) state.

It may be advantageous to add further transition metal oxides. These include the oxides of zinc, manganese vanadium, molybdenum, cobalt and nickel.

It may be advantageous to add $Na_2O$ in an amount of up to 5 parts by weight per 100 parts of the base glass to the glass composition to assist in refining and homogenising the melt and to reduce the melting temperature. Other fluxing and refining agents, such as fluorides and phosphates, may also be beneficially employed.

The constituents of the base glass may be derived from metallurgical slag if so desired. A metallurgical slag would also contribute other constituents to the melt, for example, manganese oxide.

The cooling schedule employed to produce the devitrification depends on the composition of the melt. The cooling rate is adjusted so that initially large numbers of spinel crystals form in the melt and thereafter crystals of a silicate phase grow upon the spinel nuclei. Cooling may be continuous in a series of different rates or the temperature of the melt may be held constant at one or more stages during the cooling schedule. The critical range of temperature over which the cooling must be controlled is from the temperature of melting down to 800°C, or to the chosen holding temperature, whichever is the higher. Preferably the holding temperature is maintained for a period of time of from 0 to 3 hours, more preferably ¾ to 1½ hours at between the temperature of melting and 800°C. The holding temperature should not be maintained for so long a period that excessive recrystallisation takes place. To attain a microcrystalline material having a grain size less than 2μm it is normally necessary to use a holding temperature in the range of from 800° to 1100°C., preferably from 900° to 1000°C. Compositions which give a micro-crystalline material when a holding temperature in the range 800° to 1100°C. is used can be devitrified to give coarse-grained products by holding at a higher temperature, for example in the range of from 1100° to 1200°C. should a grain size greater then 2μm be required. The ultimate grain size of the glass-ceramic material is controlled by (a) the composition of the melt and (b) the cooling schedule employed.

The invention is further illustrated with reference to the following Examples:

EXAMPLE 1

Two compositions of the following constituents were prepared:

| Base glass: | CaO | 20wt% | Additions to | | |
|---|---|---|---|---|---|
| | MgO | 14 | base glass (parts | $Cr_2O_3$ | 2 |
| | $Al_2O_3$ | 10 | per 100 parts | $Fe_2O_3$ | 3 |
| | $SiO_2$ | 56 | of base glass) | $Na_2O$ | 3 |

One composition was melted at 1450°C. for 3 hours in air, placed in furnace at 950°C. for 1 hour and thereafter cooled at natural rate to room temperature.

The other composition was melted at 1450°C. for 3 hours in air, placed in a furnace at 950°C. for 3 hours and thereafter cooled at natural rate to room temperature. The modulus of rupture ($\sigma$) was measured for six samples of the resulting material and the average value with mean deviation was calculated:

$$\sigma = 182.2 \pm 14.8 \text{ MN/m}^2 \text{ (26,400 p.s.i).}$$

EXAMPLE 2

Two compositions of the following constituents were prepared:

| Base glass: | | | | | |
|---|---|---|---|---|---|
| blast-furnace slag* | 50wt% | Additions to | $Cr_2O_3$ | 2 |
| MgO | 10 | Base glass | $Fe_2O_3$ | 2 |
| $SiO_2$ | 40 | | $Na_2O$ | 3 |

One composition was melted at 1450°C for 3 hours in air, placed in a furnace at 1000°C. for 1 hour and thereafter cooled at natural rate to room temperature. The modulus of rupture was calculated from seven samples of the resulting material:

$$\sigma = 141.2 \pm 9.7 \text{ MN/m}^2 \text{ (20,500 p.s.i).}$$

The other composition was melted at 1500°C. for 3 hours in air, placed in a furnace at 1000°C. for 1 hour, and cooled at natural rate to room temperature. The modulus of rupture was calculated from six samples of the resulting material:

$$\sigma = 145.9 \pm 23.7 \text{ MN/m}^2 \text{ (21,200 p.s.i).}$$

EXAMPLE 3

Two compositions of the following constituents were prepared:

| Base glass: | | | | | |
|---|---|---|---|---|---|
| blast-furnace slag* | 75wt% | Additions to | $Cr_2O_3$ | 2 |
| MgO | 5 | base glass | $Fe_2O_3$ | 2 |
| $SiO_2$ | 20 | | $Na_2O$ | 1.5 |

One composition was melted at 1450°C. for 3 hours in air, placed in a furnace at 900°C. for 1 hour and thereafter cooled at natural rate to room temperature.

The other composition was melted at 1450°C. for 3 hours, placed in a furnace at 900°C. for 3 hours and cooled at natural rate to room temperature. The modulus of rupture was calculated from six samples of the resulting material:

$$\sigma = 144.4 \pm 12.3 \text{ MN/m}^2 \text{ (20,900 p.s.i).}$$

EXAMPLE 4

A composition of the following constituents was prepared:

| Base glass: | | | | | |
|---|---|---|---|---|---|
| blast furnace slag* | 75wt% | Additions to | $Cr_2O_3$ | 2 |
| $SiO_2$ | 25 | base glass | $Fe_2O_3$ | 2 |

*Composition of slag used in Examples 2 to 4 (to nearest 0.5 wt%)

| | |
|---|---|
| CaO | 39.5 |
| MgO | 7.0 |
| $Al_2O_3$ | 19.0 |
| $SiO_2$ | 31.5 |
| FeO | 1.0 |
| MnO | 1.0 |
| S | 1.5 |

The composition was melted at 1500°C for 3 hours in air, placed in a furnace at 920°C for 2 hours and thereafter cooled at natural rate to room temperature.

Crystal sizes in Examples 1 to 4 lay in the range 0 to $2\mu m$, but mostly in the range 0.5 to $1.5\mu m$.

The modulus of rupture was measured by a three point loading technique, with the lower knife edges 2 cms apart, and a centrally placed upper knife edge. The specimens were about 30 mm. long, 2.5 mm. deep and 5 mm. broad, and were prepared on a surface grinder using a wheel impregnated with 200 grit diamond.

I claim:

1. A method of making a micro-crystalline material comprising the steps of
   1. preparing a melt of a composition comprising a base glass composition consisting of from 0 to 30 weight percent MgO, from 5 to 35 weight percent $Al_2O_3$, from 35 to 75 weight percent $SiO_2$, and from 0 to 30 weight percent CaO; from 0.5 to 3 parts by weight chromium oxide (expressed as $Cr_2O_3$) per 100 parts by weight of the base glass composition and from 0.5 to 10 parts by weight iron oxide (expressed as $Fe_2O_3$) per 100 parts by weight of the base glass composition, and
   2. cooling the melt at such a rate that initially crystals of spinel, mostly less than $1\mu m$ in size, are formed within the melt and subsequently crystals of a silicate phase grow upon the spinel crystals to yield the micro-crystalline material.

2. A method according to claim 1 wherein the base glass composition contains greater than 8.5 to less than 30 weight percent CaO.

3. A method according to claim 1 wherein the base glass composition contains from 5 to 30 weight percent MgO.

4. A method according to claim 1 wherein the composition contains from 0.5 to 5 parts by weight iron oxide (expressed as $Fe_2O_3$) per 100 parts by weight of the base glass composition and the melt is prepared in an oxidising atmosphere.

5. A method according to claim 1 wherein on cooling the temperature of the composition is held constant for up to 3 hours at a temperature between the temperature of melting and 800°C.

6. A method according to claim 5 wherein the temperature of the composition is held constant at a temperature of from 800° to 1100°C.

7. A method according to claim 1 wherein said melt is prepared in an oxidizing atmosphere and wherein said cooling step comprises first cooling the melt to a temperature of from 900° to 1000°C and holding the composition at this temperature for from ¾ to 1½ hours, and subsequently cooling the composition to ambient temperature.

8. A composition usable for preparing a microcrystalline material in accordance with the method of claim 1 comprising from 0 to 30 weight percent MgO, from 5 to 35 weight percent $Al_2O_3$, from 35 to 75 weight percent $SiO_2$, from 0 to 30 weight percent CaO, from 0.5 to 3 parts by weight chromium oxide (expressed as $Cr_2O_3$) per 100 parts by weight of the combined MgO, $Al_2O_3$, $SiO_2$ and CaO, and from 0.5 to 10 parts by weight iron oxide (expressed as $Fe_2O_3$) per 100 parts by weight of the combined MgO, $Al_2O_3$, $SiO_2$ and CaO.

9. A composition according to claim 8 comprising from greater than 8.5 to less than 30 weight percent CaO.

10. A composition according to claim 8 comprising from 5 to 30 weight percent MgO.

11. A composition according to claim 8 comprising 0.5 to 5 parts by weight iron oxide (expressed as $Fe_2O_3$) per 100 parts by weight of combined MgO, $Al_2O_3$, $SiO_2$ and CaO.

12. A micro-crystalline material comprising crystals of spinel less than $1\mu m$ in size and crystals of silicate phase grown on said spinel crystals, said material being made by the method of claim 1.

13. A micro-crystalline material comprising crystals of spinel less than $1\mu m$ in size and crystals of silicate phase grown on said spinel crystals, said material being made by the method of claim 2.

14. A micro-crystalline material comprising crystals of spinel less than $1\mu m$ in size and crystals of silicate phase grown on said spinel crystals, said material being made by the method of claim 3.

15. A micro-crystalline material comprising crystals of spinel less than $1\mu m$ in size and crystals of silicate phase grown on said spinel crystals, said material being made by the method of claim 4.

* * * * *